United States Patent [19]

Fedora

[11] Patent Number: 5,076,318
[45] Date of Patent: Dec. 31, 1991

[54] TAPPING TEE CUTTER FOR PLASTIC PIPE

[75] Inventor: Kendal J. Fedora, McKinney, Tex.

[73] Assignee: Phillips Petroleum Company, Bartlesville, Okla.

[21] Appl. No.: 571,389

[22] Filed: Aug. 23, 1990

[51] Int. Cl.⁵ .................... F16K 43/00; F16K 51/00
[52] U.S. Cl. ...................................... 137/318; 137/317
[58] Field of Search .................. 30/92, 358, 361, 107; 408/215; 137/317, 318

[56] References Cited

U.S. PATENT DOCUMENTS

| | | | |
|---|---|---|---|
| 3,756,261 | 9/1973 | Minchhoff | 137/318 |
| 3,896,842 | 7/1975 | Cole | 137/318 |
| 4,063,844 | 12/1977 | Pessin | 408/204 |
| 4,076,038 | 2/1978 | Wynne | 137/318 |
| 4,258,742 | 3/1981 | Louthan et al. | 137/318 |
| 4,682,624 | 7/1987 | Turner | 137/317 |
| 4,730,636 | 3/1988 | Volgstadt | 137/15 |
| 4,761,024 | 8/1988 | Ewen | 137/318 |

Primary Examiner—Douglas D. Watts
Assistant Examiner—Paul M. Heyrana
Attorney, Agent, or Firm—George E. Bogatie

[57] ABSTRACT

A cutter for tapping a plastic pipe, which is capable of retaining a cut coupon, comprises a generally cylindrical element that terminates at one end in a smooth, thin walled circular cutting edge. The cutting edge surrounds a hollow coupon receiving section of the cutter which contains internal threads for engaging the cut coupon so that the coupon is retained within the hollow section of the cutter after completion of the tapping operation. The cutter is used in conjunction with a tapping tee having an internally threaded through-bore for receiving external threads that are provided on a portion of the cutter. The cutter is rotatably advanced through the bore of the tapping tee so as to contact and then cut through the plastic pipe to be tapped.

10 Claims, 1 Drawing Sheet

TAPPING TEE CUTTER FOR PLASTIC PIPE

This invention relates to tapping a plastic pipe while the pipe is pressurized. In one aspect it relates to a method for making an opening in a plastic pipe to discharge fluid. In another aspect it relates to apparatus for cutting through a plastic pipe by use of a rotating axially advancing cutter contained in a tapping tee.

BACKGROUND

With the common use of polymeric or plastic pipe in many fluid handling systems, such as systems for domestic gas and water distribution, tapping tees for plastic pipe, which are also constructed of plastic, have come into widespread use. A tapping tee assembly generally incorporates a metal rotating cutter contained in a mounting collar portion of the tapping tee for allowing the tee to be positioned at any desired spot along a main plastic pipe to be tapped. The tapping tee has a saddle portion which conforms to the diameter of the pipe to be tapped, a through-bore path for the cutter, and also has an integral side outlet adapted for mounting to a branch connection.

The tapping tee is first attached securely to the main plastic pipe to be tapped by any suitable means. For example, the tee can be attached by fusing the saddle portion of the plastic tee assembly to the main plastic pipe with the use of a heating iron or the like. Thereafterwards, the metal cutter is rotatably advanced through the sidewall of the main plastic pipe to cut an opening therethrough, and the cutter is then withdrawn from the main pipe for establishing an open fluid passage between the main plastic pipe and the side outlet in the tee assembly. Movement of the cutter within the tee assembly is accomplished by using drive threads which are provided externally on a section of the cutter, and internally within the through-bore of the tapping tee.

Heating irons for attaching the plastic saddle of the tapping tee to the main plastic pipe have found widespread use. The heating iron typically has a curvature complementary to the curvature of the tapping tee saddle to facilitate simultaneous heating of the surfaces of the saddle and the plastic pipe until the plastic at the junction of the two surfaces softens. When sufficient softening has occurred, the heating iron is removed and the saddle of the tee is directly fused to the main pipe.

Many designs for tapping tee cutters for plastic pipe, which are capable of retaining a cut coupon within the cutter after completion of the tapping operation, have been proposed but the majority of these cutters rely on compression of the coupon within a hollow coupon receiving portion of the cutter. While such coupon compression designs have been successfully utilized in many tapping tees, such designs can encounter difficulties due to temperature expansion and contraction of the plastic pipe being tapped. This is because the amount of compression required to retain the cut coupon varies with the actual temperature in the plastic pipe being tapped.

I have discovered that the addition of internal threads in the hollow coupon receiving portion of the cutter, preferably of the same design and pitch as the external drive threads of the cutter, eliminates the need for compressed retention of the coupon. Instead, the coupon is retained by the internal threads of the cutter, and the threaded retention of the coupon is effective over a wide temperature range.

It is therefore an object of this invention to provide improved method and apparatus for tapping a plastic pipe.

Another objective of this invention is to provide method and apparatus for tapping a plastic pipe wherein a cut coupon is retained in an internally threaded hollow portion of the tapping tee cutter upon completion of the tapping operation.

SUMMARY OF THE INVENTION

In accordance with this invention, a cutter for tapping plastic pipe is provided, wherein the cutter is capable of retaining the coupon cut from the plastic pipe upon completion of the tapping operation. The cutter comprises a generally cylindrical element that is partly hollow. The cylindrical element has a vent bore therethrough, and includes first and second sections which are characterized by their respective outer diameters. Each of the two section has an essentially constant outer diameter, with the diameter of the second section being greater than the diameter of the first section.

The first section of the cutter terminates in a smooth, thin walled circular cutting edge which surrounds a hollow, axial, coupon receiving central portion. The hollow coupon receiving section is internally threaded for receiving and retaining a coupon which is cut from a plastic pipe by rotatably advancing the circular cutting edge through the pipe.

In a preferred embodiment, the cutter is used as an integral part of a tapping tee for plastic pipe. For use with the tapping tee, an axial portion at the end of the second section of the cutter is adapted for receiving an allen-head wrench. Further, the cutter is provided with external drive threads on the second section for mating with internal drive threads within the through-bore of the tapping tee. The drive threads facilitate rotational axial movement of the cutter within the tapping tee by manual use of a suitable wrench. Both the internal and external threads of the cutter, and the internal threads of the tapping tee are preferably of the same design and pitch.

In use for cutting a coupon from a pipe wall, the tapping tee is securely attached to the main pipe to be tapped, and the cutter is rotatably advanced through the sidewall of the main plastic pipe forming an aperture therein, and the cut coupon is retained by the internal threads of the cutter. Upon completion of the tapping operation, the cutter, holding the cut coupon, is withdrawn from the main pipe for opening a fluid passage between the main pipe and the integral side outlet in the tapping tee.

Other objects and advantages of the invention will be apparent from the appended claims and from the detailed description of the invention when read in conjunction with the accompanying drawings in which:

DETAILED DESCRIPTION OF THE PREFERRED EMBODIMENT

Figure 1:
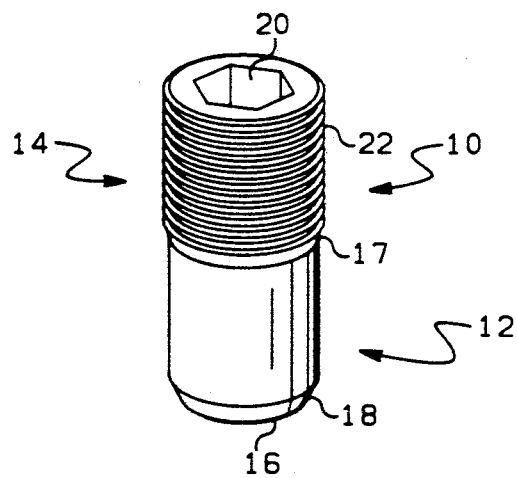
FIG. 1 is a perspective view of a cutter for plastic pipe in accordance with this invention.

Referring now to the drawings, and in particular to FIG. 1, a cutter 10 for a plastic pipe of this invention is shown in perspective view. The cutter 10 is generally a cylindrical element comprising a first section 12 and second section 14. Each of the sections 12 and 14, which make up the cylindrical element 10, has an essentially constant outer diameter, with the outer diameter of the second section 14 being greater than the outer diameter of the first section 12. The first section 12 terminates in a thin walled circular cutting edge 16. The cutting edge 16 includes a bevel 18.

The second section 14 includes a cavity 20 into which a wrench such as an allen-wrench, can be inserted for manually turning the cutter. Further external drive threads 22 are provided for facilitating use of the cutter 10 in the tapping tee. The cutter can be made of any suitable material but preferable will be made from metal such as steel, aluminum, or a suitable alloy of aluminum.

Figure 2:
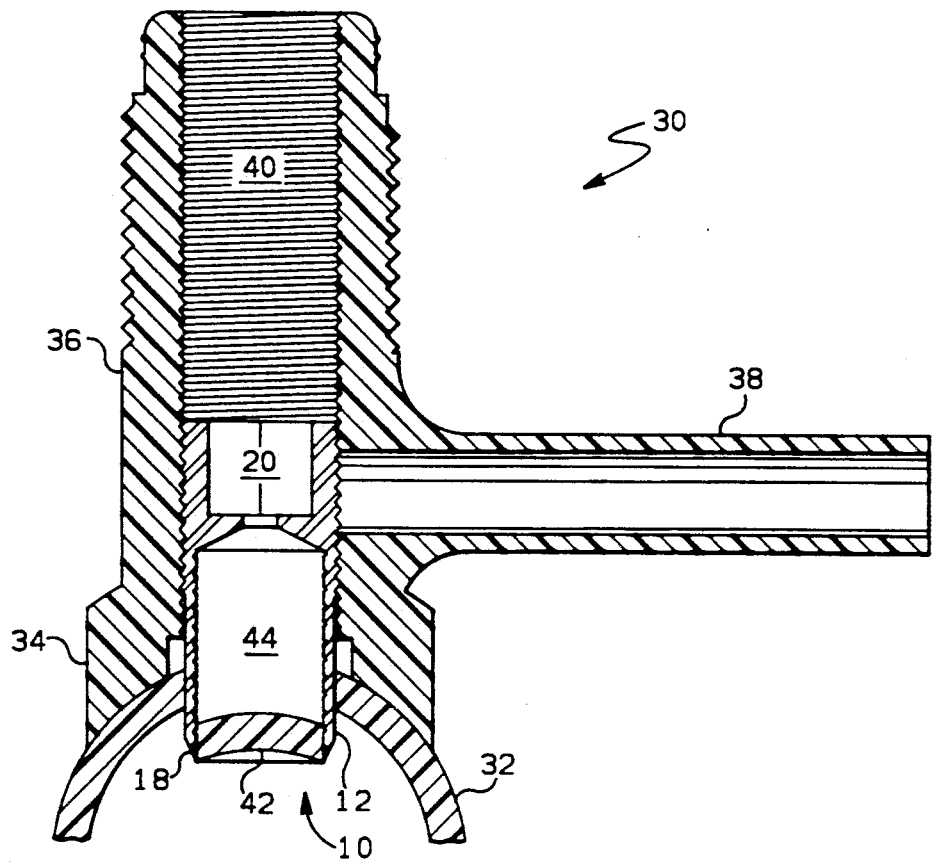
FIG. 2 is an elevation view in cross section of a preferred embodiment with the cutter positioned through the plastic pipe.

Referring now to FIG. 2, a preferred embodiment of the invention is illustrated where the same numerals are used for parts of the cutter illustrated in FIG. 1. The cutter 10, illustrated in FIG. 1, is shown in cross section in FIG. 2, and with the cutter 10 contained in a tapping tee generally illustrated at 30. The tapping tee 30 is further illustrated as being installed on a segment of a plastic pipe or conduit 32.

The tapping tee 30 generally comprises a saddle portion 34, the cutter 10, a mounting collar 36, and a tubular side outlet 38. The tapping tee 30 also has an internally threaded through-bore 40 for containing the cutter and for facilitating advancement of the cutter through the tee 30. To attain the position illustrated in FIG. 2, the cutter is advanced by way of rotation in the through-bore 40 of the tapping tee 30 by rotating the cutter using a suitable wrench that fits cavity 20.

After the cutting edge 16 contacts the outer surface of the plastic pipe 32, rotation is continued for cutting a coupon 42 from the pipe 32. A bore 33 in the cutter 10 serves as a vent connection for the hollow interior portion 44 of the cutter 10. The vent bore 33 allows greater ease in retaining cut coupons by relieving any pressure that could be caused by the compression of air within chamber 44 as the coupon advances therein. The coupon 42 is threadably received and retained in the hollow coupon receiving central portion 44 of the first section 12 of cutter 10. Rotation of the cutter 10 is then reversed and the cutter 10, with the coupon 42 held in the hollow coupon receiving central portion 44 of the first section 12 of cutter 10, is withdrawn from pipe 32 in through-bore 40 to a position in the mounting collar portion 36 of tapping tee 10. At this raised position, the cutter 10 seals off the upper portion of the through-bore 40 and provides a pathway for fluid flow from the pipe 32 through a lower portion of the through-bore 40 and outwardly through branch conduit 38.

Figure 3:
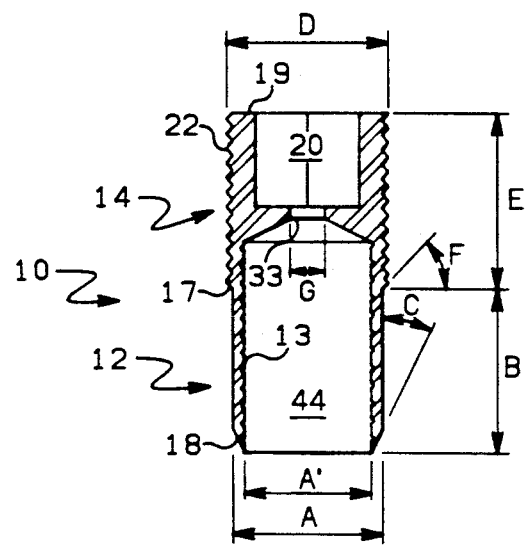
FIG. 3 is an elevation view in cross section of a cutter in accordance with this invention.

Referring now to FIG. 3 the cutter element of this invention is shown in greater detail in a cross sectional elevation view. To further illustrate the invention, example dimensions of cutters of commonly used sizes are listed in Table I below. While Table I lists example dimensions for producing various size cutter units, these dimensions are not to be taken as limiting this invention.

The cutter element 10 comprises first and second sections 12 and 14 respectively. As shown in FIG. 3, the first section 12, having an outer diameter, denoted as A in FIG. 3, extends from the cutting edge 16 to the bevel 17 at the mid portion of the cutter 10. This dimension is denoted as B in FIG. 3. The cutting edge 16 is formed by a bevel 18 on the lower external side of the first portion 12. The preferred angle of the bevel 18, denoted as C in FIG. 3, is about 15° for all of the various sized units listed in Table I. The diameter of the cutting edge 16 is denoted as A′ in FIG. 3.

The internal thread 13 of the first section 12 extends essentially the length, B, of the first section. It is generally preferred, however, to omit one or two threads adjacent the cutting edge 16. As has been previously stated it is preferred that the internal thread 13 be of the same design and pitch as the external thread 22. While the aforementioned design and pitch preference for the internal thread 13 is preferred, it is not considered to be critical, and the pitch of the internal thread 13 can vary from the pitch of the external thread 22, if desired.

The bevel 17 in the mid portion of the cutter 10 provides the division between the first and second sections of the cutter 10. The preferred angle of the bevel 17, denoted as F in FIG. 3, is 45° for all of the various size cutter units listed in Table I. The second section of cutter 10, having an outer diameter designated as D in FIG. 3, extends from the bevel 17 to the outer edge of the cutter element 19. This dimension is designated E in FIG. 3.

The external thread 22 of the second section 14 extends essentially the full length of the section 14. The second section 14 further contains a vent bore 33 along the axis of the cylindrical element 10. The dimension for the vent bore 33, which is designated G in FIG. 3, is also listed in Table I below. The second section 14 of cutter 10 also includes a cavity 20 along the axis of the cylindrical element 10 which is adapted to receive a wrench suitable for rotating the cutter 10 when the cutter 10 is inserted in to the tapping tee, such as is illustrated in FIG. 2.

TABLE I

| Example dimensions of cutters for tapping plastic pipe | | | | | |
|---|---|---|---|---|---|
| Nominal size | ½" | ¾" | 1" | 1¼" | 1½" |
| A | 0.50 | 0.75 | 0.95 | 1.2 | 1.8 |
| A′ | 0.43 | 0.68 | 0.88 | 1.1 | 1.7 |
| B | 1.2 | 1.2 | 2.4 | 1.4 | 2.4 |
| D | 0.88 | 0.88 | 1.1 | 2.0 | 2.0 |
| E | 0.75 | 0.88 | 1.6 | 2.0 | 1.8 |
| G | 3/16" | 3/16" | ¼" | ¼" | ¼" |
| Threads | ¼ | ¼ | 1¼ | 2 | 2 |

Decimal dimensions are in inches.
¼ threads are 14UNF-2A, 1¼ threads are 12UNF-2A, and 2 threads are 12UN-2A.

The invention has been described in reference to a cutter for tapping a plastic pipe in which the cutter is generally used with a tapping tee. Selection of materials for the tapping tee and the cutter should be compatible with the fluid being transported by the pipe being tapped. Preferably the tapping tee is formed of synthetic resinous materials such as thermoplastics. Suitable thermoplastic materials include olefin polymers and normally solid, moldable polyamide polymers with a preferred olefin polymer being a high density polyethylene, and a preferred polyamide polymer being nylon.

Reasonable modifications and alterations of this invention will become apparent to those skilled in the art from the foregoing discussion and accompanying drawings, and it should be understood that this invention is not to be unduly limited thereto.

That which is claimed is:

1. A cutter for tapping a plastic pipe which comprises:

a generally cylindrical element having a vent bore extending therethrough and comprising first and second sections with each of said first and second sections characterized by differing outer diameter, and wherein the outer diameter of said second section is greater than the outer diameter of said first section;

said first section of said cylindrical element terminating in a smooth, thin walled circular cutting edge which surrounds a hollow, axial, coupon receiving central portion of said first section; and said hollow coupon receiving central portion having internal threads for receiving and retaining a coupon which is cut from the plastic pipe by rotatably advancing said circular cutting edge through the plastic pipe.

2. A cutter in accordance with claim 1 wherein said second section includes a hexagonal cavity for receiving a wrench for rotating said cutter, and further wherein said second section additionally comprises:

external threads extending the full length of said second section.

3. A cutter in accordance with claim 2 additionally comprising:

a tapping tee having an internally threaded through-bore for receiving said cutter, and wherein said second section is threadibly engaged in said through-bore for supporting said cutter in said tapping tee.

4. A cutter in accordance with claim 3 wherein said cutter is formed of a metallic material and said tapping tee is formed of a synthetic resin material.

5. A method of tapping a plastic pipe which comprises:

securely attaching a tapping tee having an internally threaded through-bore to said plastic pipe;

installing a cutter having an externally threaded portion in said through-bore, wherein said cutter is threadedly supported in said through-bore of said tapping tee, and further wherein said cutter comprises:

(a) a generally cylindrical element having a vent bore extending therethrough and comprising first and second sections of said cylindrical element with each of said first and second sections characterized by differing outer diameter, and wherein the outer diameter of said second section is greater than the outer diameter of said first section;

(b) said first section of said cylindrical element terminating in a smooth thin walled circular cutting edge which surrounds a hollow, axial, coupon receiving central portion of said first section;

(c) said hollow coupon receiving central portion having internal threads for receiving and retaining a coupon which is cut from the plastic pipe; and rotatably advancing said cutter in said through-bore of said tapping tee so as to contact and then cut through and enter said plastic pipe.

6. A method in accordance with claim 5, wherein said tapping tee includes an integral side outlet, said method additionally comprising the following step:

opening a fluid passage between said plastic pipe and said integral side outlet by withdrawing said cutter from said plastic pipe.

7. A method in accordance with claim 5 wherein said cutter includes a cavity for receiving a wrench, said method additionally comprising:

inserting a wrench in said cavity and rotatively advancing said cutter in said tapping tee by turning said wrench.

8. A method in accordance with claim 5 wherein said cutter is formed of a metallic material and said tapping tee is formed of a synthetic resin material.

9. A method in accordance with claim 8 wherein said synthetic resin material is an olefin polymer.

10. A method in accordance with claim 9 wherein said olefin polymer is polyethylene.

* * * * *